US011429603B2

(12) United States Patent
Dinh et al.

(10) Patent No.: US 11,429,603 B2
(45) Date of Patent: *Aug. 30, 2022

(54) USING ARTIFICIAL INTELLIGENCE AND NATURAL LANGUAGE PROCESSING FOR DATA COLLECTION IN MESSAGE ORIENTED MIDDLEWARE FRAMEWORKS

(71) Applicant: Dell Products L.P., Round Rock, TX (US)

(72) Inventors: Hung Dinh, Austin, TX (US); Sabu K. Syed, Austin, TX (US); Satish Ranjan Das, Round Rock, TX (US); Manikandan Pammal Rathinavelu, Cedar Park, TX (US); Panguluru Vijaya Sekhar, Bangalore (IN); Kannappan Ramu, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 261 days.

This patent is subject to a terminal disclaimer.

(21) Appl. No.: 16/735,951

(22) Filed: Jan. 7, 2020

(65) Prior Publication Data
US 2021/0209102 A1 Jul. 8, 2021

(51) Int. Cl.
*G06F 7/00* (2006.01)
*G06F 16/2452* (2019.01)
(Continued)

(52) U.S. Cl.
CPC ...... *G06F 16/24522* (2019.01); *G06F 16/248* (2019.01); *G06F 16/2423* (2019.01);
(Continued)

(58) Field of Classification Search
CPC .......... G06F 16/24522; G06F 16/2423; G06F 16/248; G06F 16/252; G06F 40/295;
(Continued)

(56) References Cited

U.S. PATENT DOCUMENTS 8,682,649 B2   3/2014   Bellegarda
9,785,630 B2   10/2017  Willmore et al.
(Continued)

OTHER PUBLICATIONS

Wikipedia, "Chatbot," https://en.wikipedia.org/wiki/Chatbot, Nov. 19, 2019, 6 pages.
(Continued)

*Primary Examiner* — Mohammad A Sana
(74) *Attorney, Agent, or Firm* — Ryan, Mason & Lewis, LLP

(57) ABSTRACT

A method includes receiving a natural language query requesting data from a message oriented middleware infrastructure comprising a plurality of message oriented middleware providers, and analyzing the natural language query to determine one or more types of the data being requested. In the method, one or more queries corresponding to the determined one or more types of the data are dynamically generated. The one or more queries are in native command formats corresponding to respective ones of the plurality of message oriented middleware providers. The method also includes executing the one or more queries in the native command formats to retrieve the data from the plurality of message oriented middleware providers, and providing a response to the natural language query based on the retrieved data to a user via a user interface.

20 Claims, 10 Drawing Sheets

(51) Int. Cl.
  *G06F 16/248* (2019.01)
  *G06F 16/242* (2019.01)
  *G06N 20/00* (2019.01)
  *G06N 5/04* (2006.01)
  *G06F 16/25* (2019.01)
(52) U.S. Cl.
  CPC ............ *G06F 16/252* (2019.01); *G06N 5/04* (2013.01); *G06N 20/00* (2019.01)
(58) Field of Classification Search
  CPC .......... G06F 40/20; G06F 40/56; G06F 40/30; G06F 40/35; G06N 20/00; G06N 5/04
  See application file for complete search history.

(56) References Cited

U.S. PATENT DOCUMENTS

| | | | |
|---|---|---|---|
| 2003/0195811 A1* | 10/2003 | Hayes, Jr. .......... | G06Q 30/0623 705/26.41 |
| 2011/0047072 A1 | 2/2011 | Ciurea | |
| 2016/0036751 A1* | 2/2016 | Ban ................ | H04L 51/06 455/414.1 |
| 2021/0112178 A1* | 4/2021 | Perone ................ | G06F 40/35 |
| 2021/0286950 A1* | 9/2021 | Quamar ................ | G06F 40/35 |

OTHER PUBLICATIONS

Wikipedia, "n-gram," https://en.wikipedia.org/wiki/N-gram, Aug. 27, 2019, 7 pages.

* cited by examiner

FIG. 3
300

```
[mqm@auspimqga02 ~] $ echo "dis q1(*) where (curdepth gt 0)" | runmqsc -e GTWPRDEUO1 |
egrep -v ' (AMQ) | (MQSC) | (IBM) | (syntax) ' | xargs -n2 -d'\n' | grep -v SYSTEM | awk '
{print $1, $3}'

QUEUE (CL.PIM.ACC_HIERARCHY.AIC) CURDEPTH (642)
QUEUE (CL.PIM.ADMIN_LOOKUP.AIC) CURDEPTH (512)
QUEUE (NASTEL.REPLY.NSQMGR.INQ5DA0CC5A21B08D05) CURDEPTH (47)
QUEUE (QLESB.GLOBAL_CASE_FEED_BOQ.AIC) CURDEPTH (41)
QUEUE (QLESB.GLOBAL_CREPUBSUB_BOQ.AIC) CURDEPTH (16)
QUEUE (QLOCI.CUST_ORDER_CANCEL_BOQ.AIC) CURDEPTH (528)
QUEUE (QL.PIM.ADMIN_LOOKUP_BOQ.AIC) CURDEPTH (130)
QUEUE (QL.PIM.ITEM_PRICE_COST_BOQ.AIC) CURDEPTH(641)
[mqm@auspimqga02 ~] $ ▯
```

```
19/10/15 16:53:51 INFO zookeeper.ClientCnxn: Socket connection established, initiating
session, client: /10.175.131.78:41672, server: ausilkaf301.us.dell.com/10.175.131.78:2181
19/10/15 16:53:51 INFO zookeeper.ClientCnxn: Session establishment complete on
server ausilkaf301.us.dell.com/10.175.131.78:2181, sessionid = 0x36d5f3c5a7a7628,
negotiated timeout = 30000
19/10/15 16:53:51 INFO zkclient, ZkClient: zookeeper state changed (SyncConnected)
ESE.NOVORA.CONSUME_TO_MAIN.NOVORA.P2.R2
ESE.NOVORA.MAIN_TO_DB.NOVORA.P2.R2
ESE.NOVORA.PROJECT_COSTS.FINANCIAL_FORCE.P2.R2
ESE.NOVORA.SUPPLIERS.PRISM.P2.R2
KAFKA.TEST.TOPIC
SDS.FINANCIAL_FORCE.PROJECT.P2.R2
SDS.FINANCIAL_FORCE.PROJECTS.P2.R2
SDS.FINANCIAL_FORCE.TASK.P2.R2
SDS.FINANCIAL_FORCE.TASKS.P2.R2
SDS.FINANCIAL_FORCE.TASK_ASSIGNEMENTS.P2.R2
SDS.FINANCIAL_FORCE.TASK_TIMES.P2.R2
SDS.FINANCIAL_FORCE.TIMERECORD.P2.R2
SDS.FINANCIAL_FORCE.TIMERECORDS.P2.R2
SDS.NGMT_POC.P3.R3
TEST
__consumer_offsets
taskInput
taskOutput
timeRecordInput
timeRecordOutput
tis_test
19/10/15 16:53:51 INFO zkclient.ZkEventThread: Terminate ZkClient event thread.
19/10/15 16:53:51 INFO zookeeper.ZooKeeper: Session: 0x36d5f3c5a7a7628 closed
19/10/15 16:53:51 INFO zookeeper.ClientCnxn: EventThread shut down
[servicekfknp@ausilkaf301 ~] $ /opt/cloudera/parcels/KAFKA-3.1.0-1.3.1.0.p0.35/lib/
kafka/bin/kafka-topics.sh --list --zookeeper ausilkaf301.us.dell.com:2181/kafka
```

```
-bash-4.2$ rabbitmqctl list_vhosts | grep -v Listing
name
MST2BIL_INB
ATL2BIL_INB
VH_Gobig
/
FMP2BIL_INB
VH_Glovia
BIL_PRD
-bash-4.2$ rabbitmqctl list_queues --vhost MST2BIL_INB
Timeout: 60.0 seconds ...
Listing queues for vhost MST2BIL_INB ...
name       messages
Q.MST.FUNCTION1.BIL     0
Q.MST.FUNC_TEST.BIL     0
federation: ALT_EX.MST2BIL.TEST -> rabbit@auslabmq02.us.dell.com       0
federation: EX.MST2BIL.TEST -> rabbit@auslabmq02.us.dell.com       0
-bash-4.2$
-bash-4.2$ rabbitmqctl list_queues --vhost ATL2BIL_INB
Timeout: 60.0 seconds ...
Listing queues for vhost ATL2BIL_INB ...
name       messages
Q.ATL.FUNCTION3.BIL     0
Q.ATL.FUNCTION4.BIL     0
Q.ATL.FUNCTION2.BIL     0
Q.ATL.FUNCTION1.BIL     0
-bash-4.2$
-bash-4.2$ rabbitmqctl list_queues --vhost FMP2BIL_INB
Timeout: 60.0 seconds ...
Listing queues for vhost FMP2BIL_INB ...
name       messages
Q.FMP.FUNCTION1.BIL     0
```

*FIG. 6*
600

```
8  import panda as pd
9  from sklearn.feature_extraction.text import TfidfVectorizer
10 from sklearn.metrics.pairwise import cosine_similarity
11
12 ds = pd.read_csv(r'C:\Users\        \Documents\      \errors_all_removed_zeros1
13 len(ds)
14 #ds = pd.read_csv("test1.csv") #you can plug in your own list of products or movies o
15
16 tf = TfidfVectorizer(analyzer='word', ngram_range=(0, 3), min_df=3, stop_words=engli
17
18
19 tfidf_matrix = tf.fit_transform(ds['message_raw'])
20 cosine_similarities = cosine_similarity(tfidf_matrix,tfidf_matrix)
21
22 results = {} #dictionary created to store the result in a dictionary format (ID : (S
23
24 for idx, row in ds.iterrows () : #iterates through all the rows
25     # the below code 'similar_indice' stores similar ids based on cosine similarity.
26     similar_indices = cosine_similarities[ids].argsort() [: -7: -1] # stores (-10) most
27     similar_items = [(cosine_similarities[idx][i], ds[ 'ID' ][i]) for i in similar_indi
28     results[row[ 'ID' ]] = similar_items[1:]
29
30 #below code 'function item (id)' returns a row matching the id along with Book Title.
31 def item(id) :
32     return ds.loc[ds[ 'ID' ] == id][ 'message_row' ].tolist()[0]
33 def recommend(id, i) :
34     if (i == 0):
```

700

800

USING ARTIFICIAL INTELLIGENCE AND NATURAL LANGUAGE PROCESSING FOR DATA COLLECTION IN MESSAGE ORIENTED MIDDLEWARE FRAMEWORKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to computing environments, and more particularly to techniques for collection of data in a messaging system.

BACKGROUND

Message Oriented Middleware (MOM) is a form of middleware which is capable of facilitating transportation of messages from one component to another, and is critical to the operations of various enterprises. For example, enterprises may include applications using MOM infrastructures to process millions of messages each day.

Current systems simultaneously rely on different MOM products for managing messaging, which are executed on a distributed architecture incorporating various servers. The tools and administrative commands needed to administer and gather usage data for the MOM products are not consistent across the different MOM platforms. For example, under conventional approaches, in order to collect operational data from a messaging system using multiple MOM vendors, a MOM administrator must write and execute different scripts and/or commands in languages native to each MOM provider of a plurality of different MOM providers.

Accordingly, under current practices administrators face time consuming procedural tasks when preparing scripts and commands to gather statistical data from heterogeneous MOM environments. Existing techniques for performing health checks and gathering usage data to administer a MOM infrastructure are heavily dependent on administrator knowledge of proprietary protocols and commands of the respective MOM platforms, and fail to provide adequate solutions to address the increased complexity associated with interfacing with different MOM products to obtain messaging landscape and status information.

SUMMARY

Illustrative embodiments correspond to techniques for administration of heterogeneous MOM layers using artificial intelligence (AI) and natural language queries. Embodiments advantageously provide an interface through which users can enter natural language queries that are processed to gather data from multiple MOM vendors without requiring the user to generate different data retrieval scripts and commands for each MOM provider.

In one embodiment, a method comprises receiving a natural language query requesting data from a message oriented middleware infrastructure comprising a plurality of message oriented middleware providers, and analyzing the natural language query to determine one or more types of the data being requested. In the method, one or more queries corresponding to the determined one or more types of the data are dynamically generated. The one or more queries are in native command formats corresponding to respective ones of the plurality of message oriented middleware providers. The method also includes executing the one or more queries in the native command formats to retrieve the data from the plurality of message oriented middleware providers, and providing a response to the natural language query based on the retrieved data to a user via a user interface.

These and other illustrative embodiments include, without limitation, methods, apparatus, networks, systems and processor-readable storage media.

BRIEF DESCRIPTION OF THE DRAWINGS

FIG. 3 depicts example pseudocode for retrieval of statistical data in a native command format of a first MOM provider in an illustrative embodiment.

FIG. 4 depicts example pseudocode for retrieval of statistical data in a native command format of a second MOM provider in an illustrative embodiment.

FIG. 5 depicts example pseudocode for retrieval of statistical data in a native command format of a third MOM provider in an illustrative embodiment.

FIGS. 6 and 7 depict example pseudocode for using natural language processing (NLP) and similarity-based and propensity algorithms to match queries in a database with incoming queries in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "natural language processing (NLP)" can refer to interactions between computers and human (natural) languages, where computers are able to derive meaning from human or natural language input, and respond to requests and/or commands provided by a human using natural language.

As used herein, "natural language understanding (NLU)" can refer to a sub-category of natural language processing in AI where natural language input is disassembled and parsed to determine appropriate syntactic and semantic schemes in order to comprehend and use languages. NLU may rely on computational models that draw from linguistics to understand how language works, and comprehend what is being said by a user.

Figure 1:
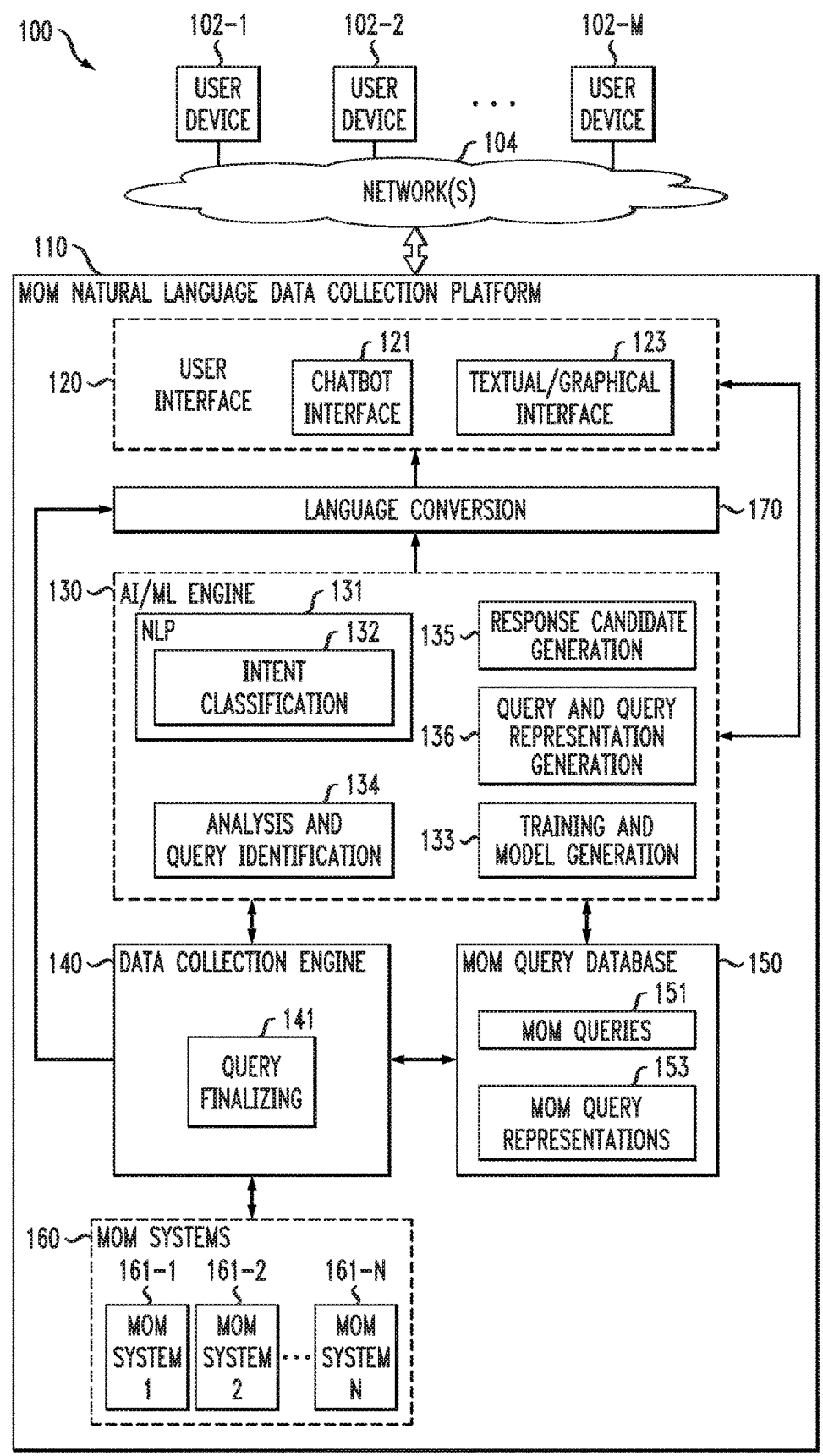
FIG. 1 is a block diagram of an information processing system comprising a MOM natural language data collection platform configured for processing natural language queries to retrieve usage data and status information from a messaging infrastructure in an illustrative embodiment.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a MOM natural language data collection platform 110.

The user devices 102 can comprise, for example, Internet of Things (IoT) devices, desktop, laptop or tablet computers, mobile telephones, or other types of processing devices capable of communicating with the MOM natural language data collection platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K, L and N are assumed to be arbitrary positive integers greater than or equal to two.

The term "client" or "user" herein is intended to be broadly construed so as to encompass numerous arrangements of human, hardware, software or firmware entities, as well as combinations of such entities. MOM data collection services may be provided for users utilizing one or more machine learning models, although it is to be appreciated that other types of infrastructure arrangements could be used. At least a portion of the available services and functionalities provided by the MOM natural language data collection platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the MOM natural language data collection platform 110, as well as to support communication between the MOM natural language data collection platform 110 and connected devices (e.g., user devices 102) and/or other related systems and devices not explicitly shown. In some embodiments, the user devices 102 are assumed to be associated with repair technicians, system administrators, information technology (IT) managers, software developers or other authorized personnel configured to access and utilize the MOM natural language data collection platform 110.

The MOM natural language data collection platform 110 in the present embodiment is assumed to be accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The MOM natural language data collection platform 110, on behalf of respective infrastructure tenants each corresponding to one or more users associated with respective ones of the user devices 102, provides for data collection from a messaging landscape using NLP and artificial intelligence/machine learning (AI/ML) techniques. According to embodiments, the MOM natural language data collection platform 110, in response to natural language queries, provides users with data from multiple MOM providers of a messaging infrastructure. The data is provided independent of propriety MOM vendor protocol implementation and commands, and includes, but is not necessarily limited to, integration status and statistics. The MOM natural language data collection platform 110 is configured for providing users with access to heterogeneous MOM servers, as well as data analytics and statistics associated with messaging being performed on and between the heterogeneous MOM servers.

Figure 2:
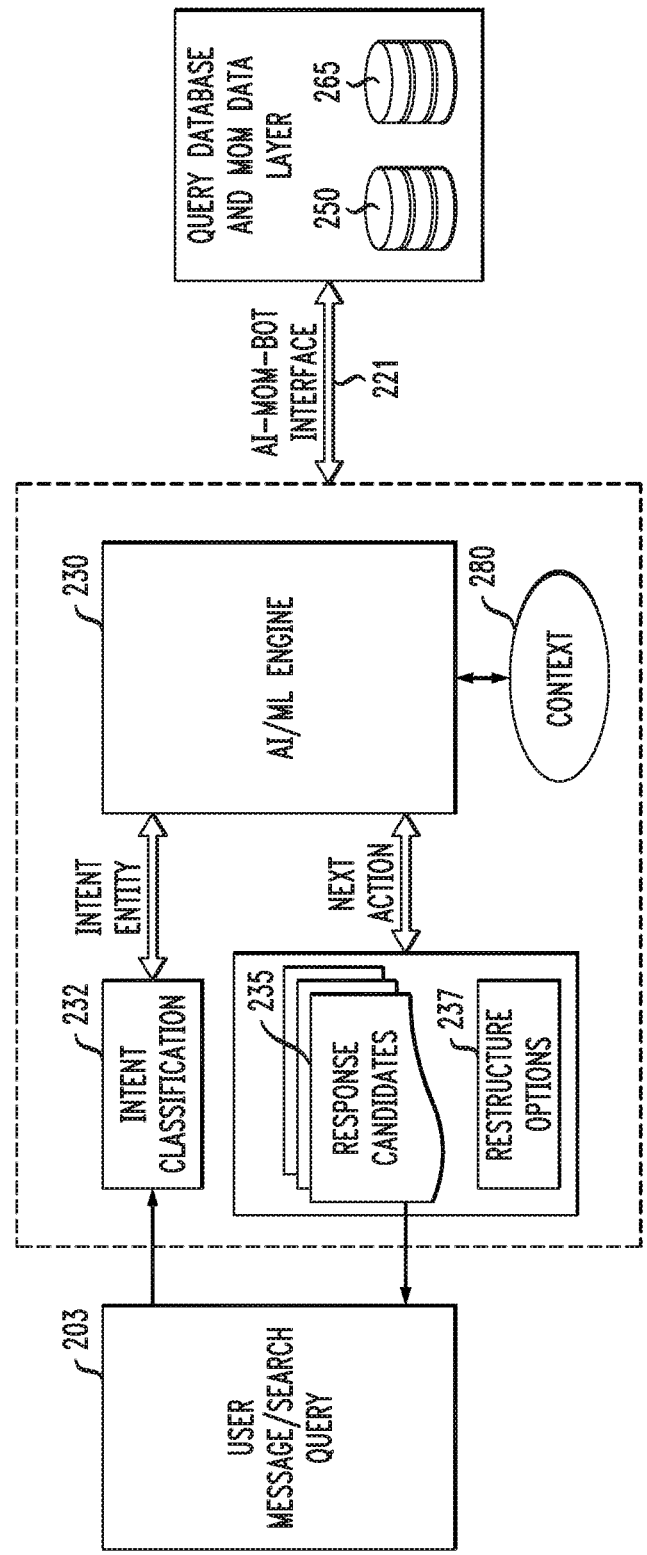
FIG. 2 is an operational block diagram of an AI-based MOM data collection architecture in an illustrative embodiment.

Referring to FIG. 1, the MOM natural language data collection platform 110 includes a user interface component 120, an AWL engine 130, a data collection engine 140, a MOM query database 150, a MOM systems component 160 comprising a plurality of MOM systems 161-1, 161-2, . . . 161-N (collectively "MOM systems 161"), and language conversion component 170. The user interface component 120 comprises a chatbot interface component 121 and a graphical interface component 123. As used herein, a "chatbot" refers to software for conducting a conversation with a user via verbal or textual methods. According to one or more embodiments, a chatbot executed by the chatbot interface component 121 interfaces with the AWL engine to utilize NLP and AWL techniques to process natural language (e.g., English, Spanish or other spoken language) queries for data about a messaging infrastructure from one or more users via user devices 102, and to provide natural language responses to the queries. Referring to FIGS. 1 and 2, the chatbot interface component 121/221 is configured to process verbal (e.g. spoken) and textual natural language search queries 203 from a user. In a non-limiting example, a user may request a list of messaging queues in a messaging infrastructure having over 50,000 messages, by stating or typing a request such as "Provide me with a list of queues with greater than 50,000 messages." The response to the user may list the queues with over 50,000 messages. The graphical interface component 123 generates graphical elements of a user interface displayed on user devices 102, such as, for example, text and command boxes, icons, and visualizations of results (e.g., graphs, charts, etc.).

The AWL engine 130 (see also AWL engine 230 in FIG. 2) includes a natural language processing (NLP) component 131, a training and model generation component 133, an analysis and query identification component 134, a response candidate generation component 135 and a query and query representation generation component 136. Using machine learning techniques, the AI/ML engine 130 executes a plurality of algorithms to perform NLP and determine similarities between users' incoming natural language requests and MOM queries 151 in a MOM query database 150 (see also database 250 in FIG. 2). Similarities can be based on, for example, distance metrics such as, but not necessarily limited to, Euclidean, Mahalanobis, cosine and propensity score metrics.

The NLP component 131 includes an intent classification module 132 which uses NLP to analyze an incoming natural language query 203 from a user to perform intent classification 232. More specifically, the intent classification module 132 uses NLP to determine one or more types of the data being requested so as to determine a context 280, which includes an intent of an incoming request and the elements of the messaging infrastructure corresponding to the requested data. For example, the types of data that can be requested include, but are not necessarily limited to, integration statistics, application statistics, system statistics, channel status, queue status, errors and/or message counts. Integration details, as well as application and queue details can be in terms of per segment, per MOM system etc. As used herein, a segment refers to a business unit (BU) or line of business. Some examples of a segment include, but are not necessarily limited to, a personal computer, a server, storage and security.

The data includes vendor specific statistical data captured from each of the MOM systems 161. The statistical data comprises, but is not necessarily limited to, messaging queue names, messaging queue statuses (e.g., online, offline, idle, active), messaging queue locations (e.g., Internet Protocol (IP) addresses, ports), messaging queue types, messaging queue depths, timestamps for messages entering and leaving message queues, transmission times of messages from messaging queues, connections between messaging queues and of messaging queues to message producers and message consumers, total number of messages, and/or message transmission rates.

In order to request and retrieve data from the different MOM systems 161 of a messaging infrastructure, queries for the different data must comprise scripts and commands in languages and formats which can be understood and processed by the different MOM systems 161. For example, the MOM systems 161 include architectures with, for example, application programming interfaces (APIs) and administrative tools to route and deliver messages.

The MOM systems 161 include servers which permit data exchange between distributed applications by sending and receiving messages. For example, an application with data to distribute (e.g., producer or publisher) sends a message with the data to another connected application (e.g., consumer or subscriber) configured to receive the message. The message is sent via one or more MOM systems 161 to the connected application.

The applications comprise, for example: (i) platforms for business process automation, which enable communication between different software systems used in an enterprise; (ii) platforms to provide programming language interoperability; (iii) platforms to provide support for web applications through, for example, servlets, struts or Java® Server Pages (JSPs); (iv) platforms for programming using certain programming languages (e.g., C, C++) to create, for example, computer applications, firmware, verification software, test code and/or simulators for various applications and hardware products; (v) platforms to provide service-oriented architecture (SOA) services including, but not necessarily limited to, distributed application components incorporating discovery, access control, data mapping and security features; and (vi) platforms to provide microservices including, but not necessarily limited to, collections of loosely coupled, fine-grained and parallelized services implementing lightweight protocols.

The applications may be operatively coupled (e.g., via one or more communication networks) to one or more back-end services. In accordance with the present disclosure, the one or more back-end services can include, for example, database management systems, such as database servers for storing and retrieving data as requested by applications, third-party customer relationship management (CRM) applications providing enterprises with an interface for case and task management, and cloud environments for enterprise solutions including, for example, information management, compliance, and business-to-business (B2B) integration.

In an embodiment, the MOM systems 161-1, 161-2, ... 161-N respectively run on different operating systems and/or platforms or different implementations of the same operating system and/or platforms. For example, the MOM systems 161 are of different types, and require different functionality or implementations of connectivity/messaging protocols, such as, for example, machine-to-machine (M2M) messaging protocols. In a non-limiting embodiment, M2M protocols can include, but are not necessarily limited to, Message Queuing Telemetry Transport (MQTT), constrained application protocol (CoAP), and/or OMA lightweight machine to machine (LWM2M).

In a non-limiting example, the MOM systems 161 can respectively correspond to different providers, which run different software and have different capabilities. Some non-limiting examples of MOM systems 161 are IBM® MQ (International Business Machines Corporation, Armonk, N.Y.), RabbitMQ® (Pivotal Software, Inc., San Francisco, Calif.), Apache™ ActiveMQ® and Apache™ Kafka® (Apache Software Foundation, Wakefield, Mass.). One or more of the MOM systems 161 can be, for example, closed and proprietary, while one or more other MOM servers 161 can be, for example, open source.

The queries 151 are compatible with the vendor specific software, commands, formats and data of the MOM system 161 for which they were developed. The queries 151 are executed to retrieve vendor specific data from the MOM system 161 with which they are compatible. For example, a first query may include code for retrieving data from a first MOM server 161-1 running a platform of a first vendor (e.g., IBM® MQ), a second query may include code for retrieving data from a second MOM server 161-2 running a platform of a second vendor (e.g., RabbitMQ®), and third query may include code for retrieving data from a third MOM server 161-N running a platform of a third vendor (e.g., Apache™ Kafke®).

For example, FIG. 3 depicts example pseudocode 300 for retrieval of statistical data in an IBM® MQ command format in an illustrative embodiment. As can be seen in FIG. 3, the code 300 relates to retrieving message depth ("curdepth") data. FIG. 4 depicts example pseudocode 400 for retrieval of statistical data in an Apache™ Kafka® command format in an illustrative embodiment, and FIG. 5 depicts example pseudocode 500 for retrieval of statistical data in a RabbitMQ® command format in an illustrative embodiment. As can be seen in FIGS. 4 and 5, the code 400 relates to retrieval of data related to task assignments and task times, and the code 500 relates to retrieving queue listings for certain virtual hosts. Code 300, 400 and 500 are examples of queries 151 in native command formats that are stored in database 150.

The analysis and query identification component 134 of the AI/ML engine 130 identifies one or more stored queries 151 in the MOM query database 150 corresponding to the determined one or more types of the data. Each type of data may correspond to, for example, a dozen or more different queries. The stored queries 151 are in native command formats corresponding to respective ones of a plurality of MOM systems 161 in a MOM infrastructure. For example, keeping with the above example of a query for a list of queues with greater than 50,000 messages, a corresponding query in a native command format of a given one of the MOM systems 161 may state "dis (ql*) where curdepth gt?" where "gt" corresponds to "greater than" and "?" corresponds to a dynamic variable, which in this case is 50,000. Since the queries in native command formats may not necessarily include terms which may be found in the incoming natural language query, the MOM query database 150 includes MOM query representations 153 corresponding to the stored queries 151. The MOM query representations 153 (also referred to as "aliases") include natural language terms which are likely to be found in the incoming natural language query. For example, in connection with a query for a list of queues with greater than 50,000 messages, the query representation 153 can be, for example, "queue greater than?", "messages queue?", "list messages queue greater than?", etc. According to an embodiment, the database 150 is configured in a relational arrangement between the stored queries 151 in the native command formats, and the corresponding query representations 153.

Figure 8:
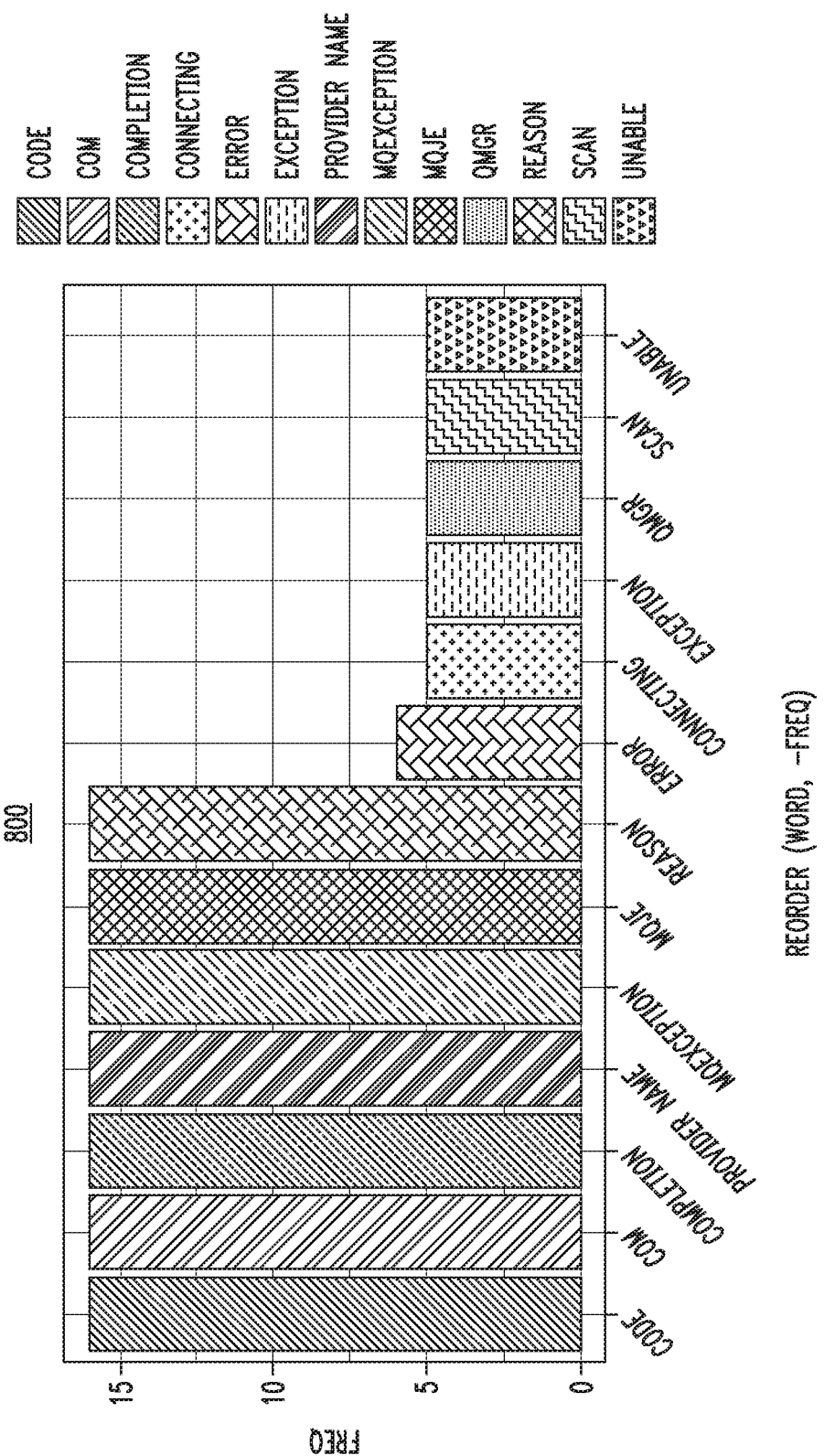
FIG. 8 is a graph depicting word frequency analysis (WFA) of an incoming query in an illustrative embodiment.

In identifying the one or more stored queries corresponding to the determined one or more types of the data, the analysis and query identification component 134 computes a similarity score between the one or more stored queries 151 and the incoming natural language query 203. The similarity score is based on terms in the natural language query 203 and terms in the query representations 153. For example, using word frequency analysis (WFA), the analysis and query identification component 134 determines the terms in the natural language query 203 having a frequency of use above a threshold, and computes the similarity score between the terms determined to have the frequency of use above the threshold and the terms in the query representations 153 representing the one or more stored queries. Referring to the graph 800 in FIG. 8, the analysis and query identification component 134 selects the words/terms from a natural language query having a frequency of use above a given threshold T (e.g., >75%) and computes similarity scores between the selected words/terms and the query representations 153 in the database 150. The similarity scores are computed using a Euclidean distance metric, a Mahalanobis distance metric, a cosine distance metric and/or a propensity score metric.

In accordance with an embodiment of the present invention, the response candidate generation component 135 ranks the one or more identified stored queries 151 according to the computed similarity score associated with each of the one or more stored queries 151. For example, the queries 151 corresponding to the representations 153 yielding higher similarity scores to the terms in the natural language query are ranked higher than the queries 151 corresponding to the representations 153 yielding lower similarity scores to the terms in the natural language query.

According to one or more embodiments, the response candidate generation component 135 provides a natural language request to the user requesting that the user confirm that the NLP component 131 accurately determined the one or more types of the data being requested. The accuracy confirmation request can include a plurality of options for selection by the user respectively identifying different ones of the determined one or more types of the data being requested. The plurality of options may be ranked in descending order according to the computed similarity score between the natural language query and given ones of the one or more stored queries 151 corresponding to different ones of the determined one or more types of the data being requested.

According to an embodiment, the analysis and query identification component 134 determines whether any of the computed similarity scores reaches or exceeds a predetermined threshold. If a similarity score to an existing query 151 in the query database 150 reaches or exceeds a predetermined threshold, then the response candidate generation component 135 provides a natural language request to the user requesting that the user confirm an accuracy of the determined one or more types of the data being requested. The natural language request comprises a plurality of options for selection by the user (e.g., response candidates 235 in FIG. 2), wherein the plurality of options respectively identify different types of the data being requested. The options are derived from the existing queries 151 where the similarity scores reach or exceed a predetermined threshold.

If similarity scores to all existing queries 151 in the query database 150 do not reach or exceed the predetermined threshold, the analysis and query identification component 134 determines that there is not a match of the incoming natural language query 203 with any of the existing queries 151. According to an embodiment, at this point, the intent classification module 132 generates one or more natural language query restructure options 237 (see FIG. 2) to be provided to a user requesting that the user restructure the natural language query 203. The restructure options 237 include, for example, suggested grammatical rephrasing and word usage modifications of the query 203 that may yield a match to an existing query 151 (i.e., similarity score above a given threshold) and/or clarify which type of data a user is requesting.

The restructure options 237 are based on the intent classification module's use of NLP to identify the one or more types of the data being requested so as to determine the context 280. The intent classification module 132 uses a determined intent of an incoming request and the elements of the messaging infrastructure corresponding to the requested data to generate the restructure options 237. The intent classification module 132 may also rely on a machine learning based knowledge base of grammatical conventions and/or previous restructure options accepted by users in connection with what the AI/ML engine 130 determines to be similar natural language queries. In a non-limiting example, an incoming natural language query 203 may state: "give me server channel counts and names." Upon finding no match with an existing query 151 in the database 150, the intent classification module 132 may generate a restructure option 237 as follows: "give me a list of all server channel connection counts and channel names." If the restructure option accurately describes the original incoming natural language query, the user can accept the restructure option. Upon acceptance of the restructure option, the analysis and query identification component 134 processes the restructured query to determine whether a match exists between the restructured query and any existing queries 151. If there are still no matches of the restructured query with any existing queries 151, a final determination is made that there is no match of an incoming query 203 with the existing queries 151. Upon a final determination that there is no match of an incoming query 203 with the existing queries 151, the query and query representation generation component 136 dynamically generates new queries and new query representations (e.g., aliases) based on the restructured query accepted by the user. In generating the dynamically generated queries, the query and query representation generation component 136 converts the restructured natural language query into one or more queries that are compatible with the vendor specific software, commands, formats and data of the MOM system 161. Similar to the queries 151, the new queries can be executed to retrieve vendor specific data from the MOM system 161 with which they are compatible. For example, a first dynamically generated query may include code for retrieving data from a first MOM server 161-1 running a platform of a first vendor (e.g., IBM® MQ), a second dynamically generated query may include code for retrieving data from a second MOM server 161-2 running a platform of a second vendor (e.g., RabbitMQ®), and third dynamically generated query may include code for retrieving data from a third MOM server 161-N running a platform of a third vendor (e.g., Apache™ Kafka®).

The query and query representation generation component 136 also dynamically generates natural language query representations corresponding to the newly generated queries, which are stored along with the newly generated queries in a query database 150. The dynamically generated query representations and queries added to the database 150 become existing queries 151 and query representations 153 which can be compared to future incoming natural language queries inputted by users.

In keeping with the above non-limiting example of a request for a list of all server channel connection counts and channel names, the query and query representation generation component 136 may dynamically generate a new natural language query representation (e.g., alias) as follows: "server channel connection count and channel names", and also generate a corresponding new query based on the key words in the query representation. For example, one of the new queries in a vendor specific format may be stated as follows: "echo 'DISPLAY CHS(*) where(CHLTYPE eq SVRCONN)' |runmqsc xxxx|grep CHANNEL|sort|uniq-c." The execution of new queries and retrieval of the results of the execution of the new queries is performed using the same or similar techniques and components as those discussed herein in connection with executing the existing queries 151.

According to an embodiment, if the restructure option does not accurately describe the original incoming natural language query, the user can reject the restructure option, and the intent classification module 132 may provide additional restructure options to the user. Based on a configurable retry parameter, restructure options can be provided to users for a predetermined number of times or until a user indicates acceptance of an option. If no restructure options are accepted before the predetermined number of times, the query and query representation generation component 136 can be configured to generate a new query and query representation based on the original incoming query that was not able to be restructured, or provide the user with a failure message that the query is not able to be answered.

In determining frequencies of use of words in the incoming natural language queries or restructured natural language queries, term frequency-inverse document frequency (tf-idf) is utilized to identify and rank key words or phrases based on a term or phrase's frequent appearance in a particular query and lack of or infrequent appearance in a corpus, wherein the corpus is, for example, a plurality of natural language queries. For example, tf-idf refers to a numerical statistic reflecting the importance of a word to a query with respect to a corpus. The tf-idf value increases proportionally to the number of times a word appears in the query, but is also offset by the frequency of the word in the corpus, taking into account that some words are generally more common than others. It is to be understood that the embodiments are not limited to the use of tf-idf.

As can be understood, in one or more embodiments, the AI/ML, engine 130 learns to rank stored queries 151, and to create optimal lists of response candidates 235 based on similarity score. The machine learning algorithms group topics from incoming queries into clusters around sets of similar words or n-grams. As used herein, "n-grams" refer to combinations of adjacent words or letters from a text or speech corpus. More specifically, an n-gram is contiguous sequence of n items (e.g., phonemes, syllables, letters, words, base pairs) from a given sample of text or speech. The response candidate generation component 135 provides as a first search query option to a user the cluster that contains the relatively highest propensity score count of words or n-grams relevant to the incoming search query.

From the computed similarity scores, the response candidate generation component 135 assigns the existing queries 151 in the database 150 to respond to the incoming query. Topic modeling coupled with propensity scores is implemented to generate a lower-dimensional representation of text to match search results with similar propensity scores to the incoming search query.

In identifying the one or more stored queries corresponding to the determined one or more types of the data, a processing platform is configured to use one or more machine learning techniques. According to the embodiments, the machine learning techniques utilize, for example, propensity score models, WFA models, NLP models, a support vector machine (SVM) and/or neural networks.

Figure 7:
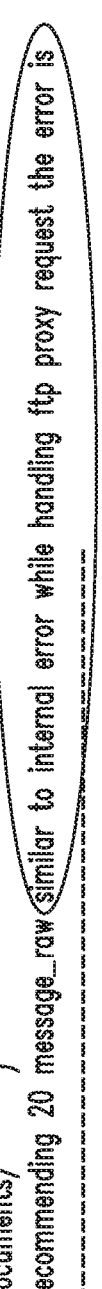

FIGS. 6 and 7 depict example pseudocode 600 and 700 for using natural language processing (NLP) and similarity-based and propensity algorithms to match queries in a database with incoming queries in an illustrative embodiment. Referring to FIG. 6, the pseudocode 600 relates to using tf-idf, n-grams and cosine similarity. In FIG. 7, the pseudocode 700 shows computation of similarity scores (see arrows) in connection with a search query (see circled portion).

According to an embodiment, previously determined conclusions and user feedback about the types of data being sought in the natural language queries and the corresponding query terms and queries 151 are input to a database of historical data accessible by the training and model generation component 133. Training datasets comprising the historical data are used by the training and model generation component 133 to train the one or more machine learning models used in connection with identifying the relevant queries 151 or generating the new queries to obtain the data requested in the incoming queries. The training and model generation component 133 of the AI/ML engine 130 is trained based on historical data taken over various time periods, such as, but not necessarily limited to, one, two or six months, or one or two years. The historical data is continuously updated based on feedback from the AI/ML, layer 130.

The data collection engine 140 executes the dynamically generated queries and/or the existing queries 151 determined to be responsive to the incoming natural language query. As noted above, the existing queries 151 and the dynamically generated queries are in the native command format of the corresponding MOM system 161 from which the data is to be retrieved. The existing queries 151 and the dynamically generated queries may include variables that are assigned by the query finalizing component 141 when completing the query. In other words, in executing the existing queries 151 and the dynamically generated queries, the query finalizing component 141 inserts one or more dynamic variables based on the natural language query into the existing queries 151 and/or the dynamically generated queries. For example, in the operational example discussed herein, a user requests those queues with over 50,000 messages. In this case, the query finalizing component 141 assigns the value of 50,000 for "?" to the existing query 151. Using the chatbot and/or graphical interfaces 121 and 123, a response to the natural language query is provided to a user via a user device 102. In the operational example, the response includes a natural language response including a list of the names of the queues with greater than 50,000 messages. A language conversion component 170 may be used to format data received from the data collection engine 140 and/or the AWL engine 130 into a natural language format. In an embodiment, the conversion component 170 converts vendor specific statistical data into a natural language format including generic MOM terminology. In a non-limiting illustrative example, the total number of messages in a queue may be represented by different words and/or phrases depending on the MOM provider (e.g., in IBM® MQ and RabbitMQ®, the total number of messages in a queue are referred to as "curdepth" and "messages_ready," respectively), which may be translated to, for example, "total messages" for viewing by a user on a user device 102. The data collected from the MOM systems 161 by the data collection engine 140 may be stored in a database, such as a MOM database 265 shown in FIG. 2.

The databases 150, 250 and 265 in some embodiments are implemented using one or more storage systems or devices associated with the MOM natural language data collection platform 110. In some embodiments, one or more of the storage systems utilized to implement the databases 150, 250 and 265 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, NAS, storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the MOM natural language data collection platform 110, the user interface component 120, the AWL engine 130, the data collection engine 140, the MOM query database 150, the MOM systems component 160, and/or the language conversion component 170 in other embodiments can be implemented at least in part externally to the MOM natural language data collection platform 110, for example, as stand-alone servers, sets of servers or other types of systems coupled to the network 104. For example, the user interface component 120, the AI/ML engine 130, the data collection engine 140, the MOM query database 150, the MOM systems component 160, and/or the language conversion component 170 may be provided as cloud services accessible by the MOM natural language data collection platform 110.

The user interface component 120, the AI/ML engine 130, the data collection engine 140, the MOM query database 150, the MOM systems component 160, and/or the language conversion component 170 in the FIG. 1 embodiment are each assumed to be implemented using at least one processing device. Each such processing device generally comprises at least one processor and an associated memory, and implements one or more functional modules for controlling certain features of the user interface component 120, the AI/ML, engine 130, the data collection engine 140, the MOM query database 150, the MOM systems component 160, and/or the language conversion component 170.

At least portions of the MOM natural language data collection platform 110 and the components thereof may be implemented at least in part in the form of software that is stored in memory and executed by a processor. The MOM natural language data collection platform 110 and the components thereof comprise further hardware and software required for running the MOM natural language data collection platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the user interface component 120, the AWL engine 130, the data collection engine 140, the MOM query database 150, the MOM systems component 160, the language conversion component 170 and other components of the MOM natural language data collection platform 110 in the present embodiment are shown as part of the MOM natural language data collection platform 110, at least a portion of the user interface component 120, the AWL engine 130, the data collection engine 140, the MOM query database 150, the MOM systems component 160, the language conversion component 170 and other components of the MOM natural language data collection platform 110 in other embodiments may be implemented on one or more other processing platforms that are accessible to the MOM natural language data collection platform 110 over one or more networks. Such components can each be implemented at least in part within another system element or at least in part utilizing one or more stand-alone components coupled to the network 104.

It is assumed that the MOM natural language data collection platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the user interface component 120, the AWL engine 130, the data collection engine 140, the MOM query database 150, the MOM systems component 160, the language conversion component 170 and other components of the MOM natural language data collection platform 110, and the elements thereof can each be implemented in the form of one or more LXCs running on one or more VMs. Other arrangements of one or more processing devices of a processing platform can be used to implement the user interface component 120, the AWL engine 130, the data collection engine 140, the MOM query database 150, the MOM systems component 160, and the language conversion component 170, as well as other components of the MOM natural language data collection platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the MOM natural language data collection platform 110 to reside in different data centers. Numerous other distributed implementations of the MOM natural language data collection platform 110 are possible.

Accordingly, one or each of the user interface component 120, the AWL engine 130, the data collection engine 140, the MOM query database 150, the MOM systems component 160, the language conversion component 170 and other components of the MOM natural language data collection platform 110 can each be implemented in a distributed manner so as to comprise a plurality of distributed components implemented on respective ones of a plurality of compute nodes of the MOM natural language data collection platform 110.

It is to be appreciated that these and other features of illustrative embodiments are presented by way of example only, and should not be construed as limiting in any way.

Accordingly, different numbers, types and arrangements of system components such as the user interface component 120, the AI/ML, engine 130, the data collection engine 140, the MOM query database 150, the MOM systems component 160, the language conversion component 170 and other components of the MOM natural language data collection platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the MOM natural language data collection platform can be offered to cloud infrastructure customers or other users as part of FaaS, CaaS and/or PaaS offerings.

Figure 9:
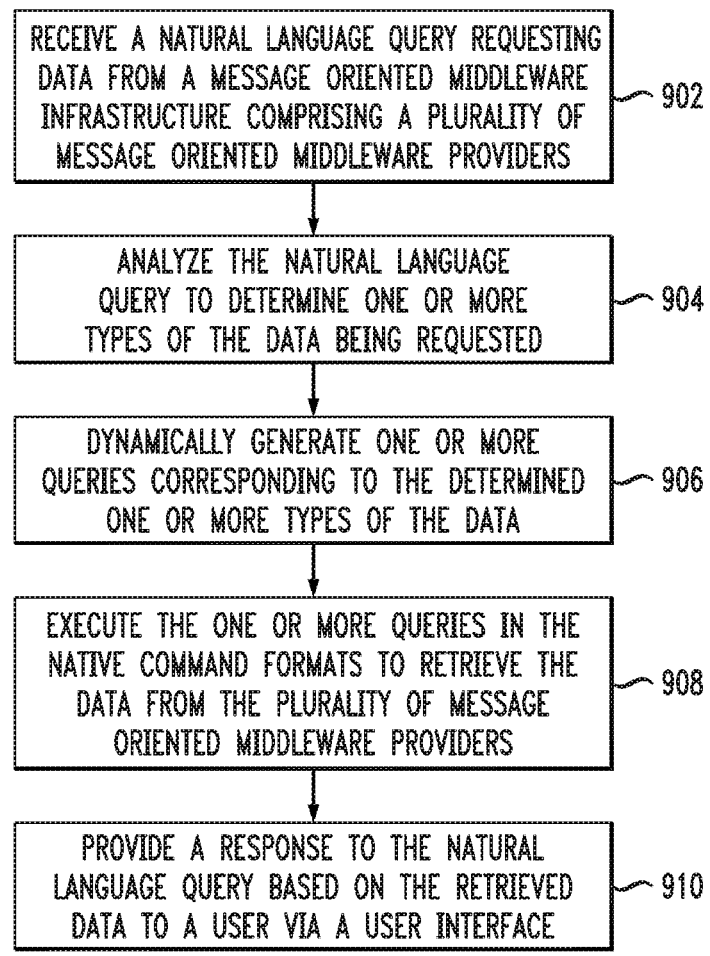
FIG. 9 is a flow diagram of a method for processing natural language queries to retrieve usage data and status information from a messaging infrastructure in an illustrative embodiment.

The operation of the information processing system 100 will now be described in further detail with reference to the flow diagram of FIG. 9. With reference to FIG. 9, a process 900 for processing natural language queries to retrieve usage data and status information from a messaging infrastructure as shown includes steps 902 through 910, and is suitable for use in the system 100 but is more generally applicable to other types of information processing systems comprising a MOM natural language data collection platform configured for processing natural language queries to retrieve usage data and status information from a messaging infrastructure.

In step 902, a natural language query requesting data from a message oriented middleware infrastructure comprising a plurality of message oriented middleware providers is received. In step 904, the natural language query is analyzed to determine one or more types of the data being requested. NLP techniques are used to determine the one or more types of the data being requested. The one or more types of the data can include, but is not necessarily limited to, integration statistics, application statistics, system statistics, channel status, queue status, errors and/or message counts.

In step 906, one or more queries corresponding to the determined one or more types of the data are dynamically generated. The one or more queries are in native command formats corresponding to respective ones of the plurality of message oriented middleware providers.

According to an embodiment, the process includes identifying whether any of a plurality of stored queries correspond to the determined one or more types of the data. The identifying includes computing a plurality of similarity scores between the plurality of stored queries and the natural language query, and determining whether any of the plurality of similarity scores reaches or exceeds a predetermined threshold. The identifying is performed using one or more machine learning techniques. The similarity scores are based on terms in the natural language query and terms representing the one or more stored queries (e.g., query representations 153). For example, the terms in the natural language query having a frequency of use above a threshold are determined using, for example tf-idf metrics, and the similarity score is computed between the terms determined to have the frequency of use above the threshold and the terms representing the one or more stored queries.

The process also includes determining that there is not a match of the natural language query with any of the plurality of stored queries if none of the plurality of similarity scores reaches or exceeds the predetermined threshold. One or more natural language query restructure options (e.g., restructure options 237) are generated in response to the determination that there is not a match, and the one or more natural language query restructure options are sent to the user with a request that the user restructure the natural language query. The one or more natural language query restructure options can comprise, for example, grammatical rephrasing of and/or word modifications to the natural language query.

The user can accept a given natural language query restructure option of the one or more natural language query restructure options, and dynamically generating the one or more queries include converting the given natural language query restructure option into the one or more queries. The user can also reject the one or more natural language query restructure options, wherein one or more additional natural language query restructure options are generated in response to the rejection.

According to an embodiment, the process also includes dynamically generating one or more query representations corresponding to the dynamically generated one or more queries, wherein the one or more query representations comprise natural language terms representing the dynamically generated one or more queries.

In step 908, the one or more queries in the native command formats are executed to retrieve the data from the plurality of message oriented middleware providers, and in step 910, a response to the natural language query based on the retrieved data is provided to a user via a user interface, which may be a chatbot interface. As noted above, the dynamically generated queries are compatible with the vendor specific software, commands, formats and data of the MOM system 161 for which they were developed. The dynamically generated queries are executed to retrieve vendor specific data from the MOM system 161 with which they are compatible. The native command formats corresponding to different ones of the plurality of message oriented middleware providers are different. Executing the one or more queries can include inserting one or more variables based on the natural language query into the one or more queries. For example, as noted above, the generated queries can be configured with one or more dynamic variables (e.g., numbers of messages) which vary with different user requests.

It is to be appreciated that the FIG. 9 process and other features and functionality described above can be adapted for use with other types of information systems configured to execute MOM data collection services on a MOM natural language data collection platform or other type of processing platform.

The particular processing operations and other system functionality described in conjunction with the flow diagram of FIG. 9 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 9 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a MOM natural language data collection platform as disclosed herein can provide a number of significant advantages relative to conventional arrangements. For example, one or more embodiments are configured to provide robust administration of heterogeneous MOM layers using AI/ML, techniques to process natural language queries for data about a messaging infrastructure through a MOM chatbot interface and get a real-time response. The embodiments expedite architectural decisions and/or planning in a MOM network infrastructure. The MOM chatbot interface, which may operate as a back-end service, runs through a plurality of algorithms, such as NLP similarity-based algorithms, and finds propensity scores of stored queries relevant to incoming natural language search queries.

The embodiments advantageously provide users with an improved administration experience through natural language processing and similarity analysis, providing faster results, turnaround time and decision making than with conventional processing techniques. Since the embodiments take a natural language request as input, and match the natural language request with vendor specific queries, MOM administrators are not required to learn commands and/or formats of different MOM service providers.

The embodiments provide a light weight and MOM vendor neutral solution, which can be expanded to new MOM providers. Unlike conventional solutions, which require a user to develop and execute proprietary data retrieval code for multiple MOM service providers in order to obtain data regarding the components of messaging landscape, the MOM natural language data collection platform, according to one or more embodiments, enables users to access data of a messaging integration landscape via a single managed user interface.

The MOM chatbot interface implementation advantageously achieves conversational style administration for heterogeneous MOM environments, and automated capture of messaging data without vendor propriety command dependency. The embodiments provide MOM administrators access to statistical data, health status and integration status of a MOM landscape, as well as predictive reports and statistics.

The embodiments also advantageously provide for the dynamic generation of new queries in native command formats compatible with different MOM vendors in the messaging infrastructure. Using a configurable retry parameter, the system provides a user with suggested query language to restructure an incoming natural language query. Based on the user's responses to the requests to restructure, the system generates the new queries by converting the restructured query from natural language to the native command formats of the different MOM vendors.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors.

Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the MOM natural language data collection platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a MOM natural language data collection platform in illustrative embodiments. These and other cloud-based systems in illustrative embodiments can include object stores.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
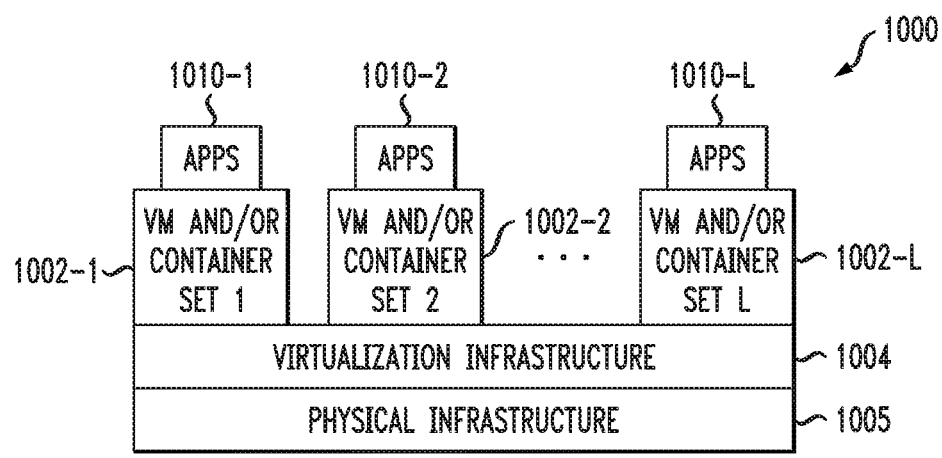
FIGS. 10 and 11 show examples of processing platforms that may be utilized to implement at least a portion of an information processing system in illustrative embodiments.
Figure 11:
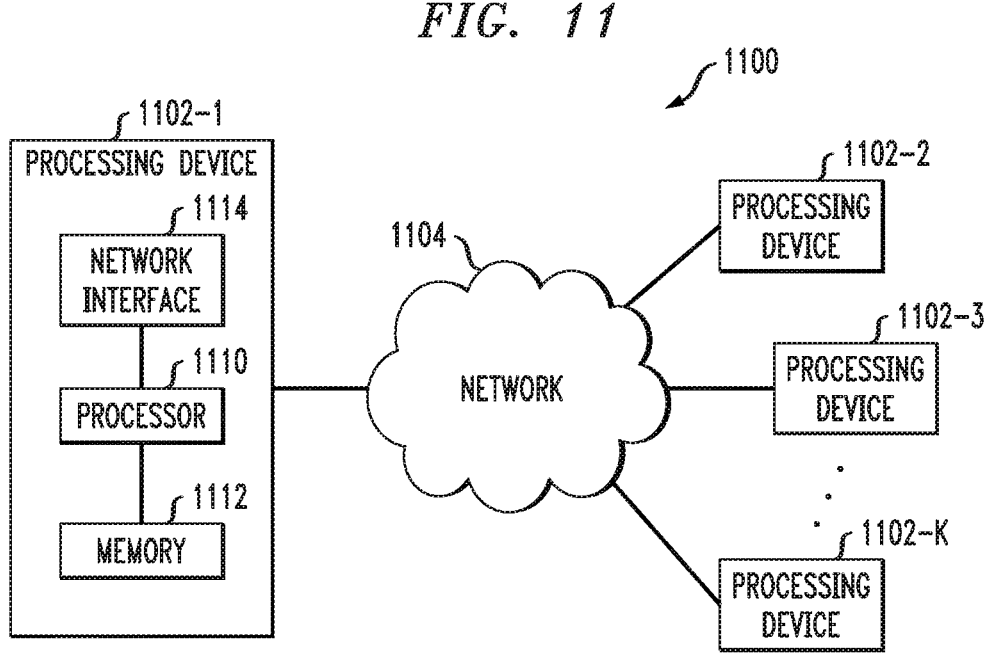

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112. The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the MOM natural language data collection platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and MOM natural language data collection platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured:
   to receive a natural language query requesting data from a message oriented middleware infrastructure comprising a plurality of message oriented middleware providers;
   to analyze the natural language query to determine one or more types of the data being requested;
   to dynamically generate one or more queries corresponding to the determined one or more types of the data;
   wherein the one or more queries are in native command formats corresponding to respective ones of the plurality of message oriented middleware providers;
   to execute the one or more queries in the native command formats to retrieve the data from the plurality of message oriented middleware providers;
   to provide a response to the natural language query based on the retrieved data to a user via a user interface; and
   to identify whether any of a plurality of stored queries correspond to the determined one or more types of the data;
   wherein, in identifying whether any of the plurality of stored queries correspond to the determined one or more types of the data, said at least one processing platform is configured to compute a plurality of similarity scores between the plurality of stored queries and the natural language query.

2. The apparatus of claim 1 wherein, in analyzing the natural language query, said at least one processing platform is configured to use natural language processing techniques to determine the one or more types of the data being requested.

3. The apparatus of claim 1 wherein the one or more types of the data comprise at least one of integration statistics, application statistics, system statistics, channel status, queue status, errors and message counts.

4. The apparatus of claim 1
   wherein, in identifying whether any of the plurality of stored queries correspond to the determined one or more types of the data, said at least one processing platform is further configured
   to determine whether any of the plurality of similarity scores reaches or exceeds a predetermined threshold.

5. The apparatus of claim 4 wherein, in identifying whether any of the plurality of stored queries correspond to the determined one or more types of the data, said at least one processing platform is configured to use one or more machine learning techniques.

6. The apparatus of claim 4 wherein said at least one processing platform is further configured to determine that there is not a match of the natural language query with any of the plurality of stored queries if none of the plurality of similarity scores reaches or exceeds the predetermined threshold.

7. The apparatus of claim 6 wherein said at least one processing platform is further configured:
   to generate one or more natural language query restructure options in response to the determination that there is not a match; and
   to send the one or more natural language query restructure options to the user with a request that the user restructure the natural language query.

8. The apparatus of claim 7 wherein the one or more natural language query restructure options comprise at least one of grammatical rephrasing of and word modifications to the natural language query.

9. The apparatus of claim 7 wherein said at least one processing platform is further configured to receive from the user an acceptance of a given natural language query restructure option of the one or more natural language query restructure options;
   wherein, in dynamically generating the one or more queries, said at least one processing platform is configured to convert the given natural language query restructure option into the one or more queries.

10. The apparatus of claim 7 wherein said at least one processing platform is further configured:

to receive from the user a rejection of the one or more natural language query restructure options; and to generate one or more additional natural language query restructure options in response to the rejection.

11. The apparatus of claim 1 wherein said at least one processing platform is further configured to dynamically generate one or more query representations corresponding to the dynamically generated one or more queries, wherein the one or more query representations comprise natural language terms representing the dynamically generated one or more queries.

12. The apparatus of claim 1 wherein the user interface comprises a chatbot interface.

13. The apparatus of claim 1 wherein, in executing the one or more queries, said at least one processing platform is configured to insert one or more variables based on the natural language query into the one or more queries.

14. The apparatus of claim 1 wherein the native command formats corresponding to the respective ones of the plurality of message oriented middleware providers are different.

15. A method comprising:

receiving a natural language query requesting data from a message oriented middleware infrastructure comprising a plurality of message oriented middleware providers;

analyzing the natural language query to determine one or more types of the data being requested;

dynamically generating one or more queries corresponding to the determined one or more types of the data;

wherein the one or more queries are in native command formats corresponding to respective ones of the plurality of message oriented middleware providers;

executing the one or more queries in the native command formats to retrieve the data from the plurality of message oriented middleware providers;

providing a response to the natural language query based on the retrieved data to a user via a user interface; and identifying whether any of a plurality of stored queries correspond to the determined one or more types of the data;

wherein the identifying comprises computing a plurality of similarity scores between the plurality of stored queries and the natural language query; and wherein the method is performed by at least one processing platform comprising at least one processing device comprising a processor coupled to a memory.

16. The method of claim 15 wherein the identifying further comprises determining whether any of the plurality of similarity scores reaches or exceeds a predetermined threshold.

17. The method of claim 16 further comprising determining that there is not a match of the natural language query with any of the plurality of stored queries if none of the plurality of similarity scores reaches or exceeds the predetermined threshold.

18. The method of claim 17 further comprising:

generating one or more natural language query restructure options in response to the determination that there is not a match; and sending the one or more natural language query restructure options to the user with a request that the user restructure the natural language query.

19. A computer program product comprising a non-transitory processor-readable storage medium having stored therein program code of one or more software programs, wherein the program code when executed by at least one processing platform causes said at least one processing platform:

to receive a natural language query requesting data from a message oriented middleware infrastructure comprising a plurality of message oriented middleware providers;

to analyze the natural language query to determine one or more types of the data being requested;

to dynamically generate one or more queries corresponding to the determined one or more types of the data;

wherein the one or more queries are in native command formats corresponding to respective ones of the plurality of message oriented middleware providers;

to execute the one or more queries in the native command formats to retrieve the data from the plurality of message oriented middleware providers;

to provide a response to the natural language query based on the retrieved data to a user via a user interface; and to identify whether any of a plurality of stored queries correspond to the determined one or more types of the data;

wherein, in identifying whether any of the plurality of stored queries correspond to the determined one or more types of the data, the program code causes said at least one processing platform to compute a plurality of similarity scores between the plurality of stored queries and the natural language query.

20. The computer program product according to claim 19 wherein, in identifying whether any of the plurality of stored queries correspond to the determined one or more types of the data, the program code further causes said at least one processing platform to determine whether any of the plurality of similarity scores reaches or exceeds a predetermined threshold.

* * * * *